United States Patent [19]

Nankaku

[11] Patent Number: 5,134,570
[45] Date of Patent: Jul. 28, 1992

[54] OFFSET CONFIGURATION FORMING METHOD

[75] Inventor: Shigeki Nankaku, Aichi, Japan

[73] Assignee: Mitsubishi Denki K.K., Tokyo, Japan

[21] Appl. No.: 415,213

[22] PCT Filed: Jan. 20, 1989

[86] PCT No.: PCT/JP89/00048

§ 371 Date: Sep. 18, 1989

§ 102(e) Date: Sep. 18, 1989

[87] PCT Pub. No.: WO89/06585

PCT Pub. Date: Jul. 27, 1989

[30] Foreign Application Priority Data

Jan. 20, 1988 [JP] Japan ................................. 63-8490
Feb. 23, 1988 [JP] Japan ................................. 63-38498

[51] Int. Cl.$^5$ ..................... G05B 19/18; G06F 15/46
[52] U.S. Cl. ..................... 364/474.35; 364/474.18; 364/474.29; 318/572
[58] Field of Search ............. 364/474.06, 474.18, 364/474.29, 474.35, 474.32; 318/572

[56] References Cited

U.S. PATENT DOCUMENTS

| | | | |
|---|---|---|---|
| 4,035,706 | 7/1977 | Cutler | 318/572 |
| 4,445,182 | 4/1984 | Morita et al. | 364/474.18 |
| 4,503,493 | 3/1985 | Burkhardt et al. | 364/474.18 |
| 4,533,286 | 8/1985 | Kishi et al. | 364/474.18 |
| 4,558,977 | 12/1985 | Inoue et al. | 318/572 |
| 4,559,601 | 12/1985 | Kishi et al. | 364/474.18 |
| 4,575,791 | 3/1986 | Schwefel | 364/474.18 |
| 4,659,265 | 4/1987 | Kishi et al. | 364/474.18 |
| 4,713,747 | 12/1987 | Niwa | 364/474.22 |
| 4,789,931 | 12/1988 | Kuragano et al. | 364/474.18 |
| 4,837,703 | 6/1989 | Kakazu et al. | 364/474.18 |
| 4,926,338 | 5/1990 | Nankaku | 364/474.18 |

FOREIGN PATENT DOCUMENTS

| | | |
|---|---|---|
| 57-96752 | 6/1982 | Japan . |
| 58-120447 | 7/1983 | Japan . |
| 59-152047 | 8/1984 | Japan . |
| 59-184910 | 10/1984 | Japan . |
| 0295110 | 12/1987 | Japan ................ 364/474.35 |
| 8906005 | 6/1989 | Japan ................ 364/474.29 |
| 2089068 | 6/1982 | United Kingdom .......... 364/474.35 |

*Primary Examiner*—Jerry Smith
*Assistant Examiner*—Tom Brown
*Attorney, Agent, or Firm*—Sughrue, Mion, Zinn, Macpeak & Seas

[57] ABSTRACT

In a method of forming an offset configuration for a cutting tool which is used to machine a workpiece under the control of a numerical control device, both in the case where a cutting tool having first and second edges on both sides which have nose Rs, respectively, are used in such a manner that the cutting tool is moved horizontally and vertically with respect to a workpiece rotating, and the first edge is used when a machine configuration increases in vertical coordinate, and the second edge is used when a machining configuration decreases in vertical coordinate, and in the case where a cutting tool having first and second edges on both sides which have nose Rs, respectively, and provide a predetermined inclination angle $\theta$ is used in such a manner that the tool is moved horizontally and vertically with respect to a workpiece rotating, and the first edge is used when the inclination angle, in a vertical direction, of a machining configuration is smaller than the inclination angle $\theta$, and the second edge is used when the inclination angle, in a vertical direction, of a machining configuration is larger than the inclination angle $\theta$, the offset configuration is formed with the center of the tip of one of the edges of the cutting tool as the control center according to the final machining configuration, with the results that the machine tool operating under the control of a numerical control device can machine a workpiece with a cutting tool having right and left edges, with the machining time reduced as much.

2 Claims, 15 Drawing Sheets

FIG. 2
| MACHINING | LATHE TURNING | | | | | |
|---|---|---|---|---|---|---|
| TOOL | ------ | LEFT NOSE R | ------ | RIGHT NOSE R | ------ | |
| CONFIGURATION | X | Z | R | ------ | | |
| STRAIGHT LINE | 100 | 5 | | | | |
| STRAIGHT LINE | 20 | 15 | | | | |
| STRAIGHT LINE | 20 | 35 | | | | |
| ARC | 20 | 55 | 10 | | | |
5a
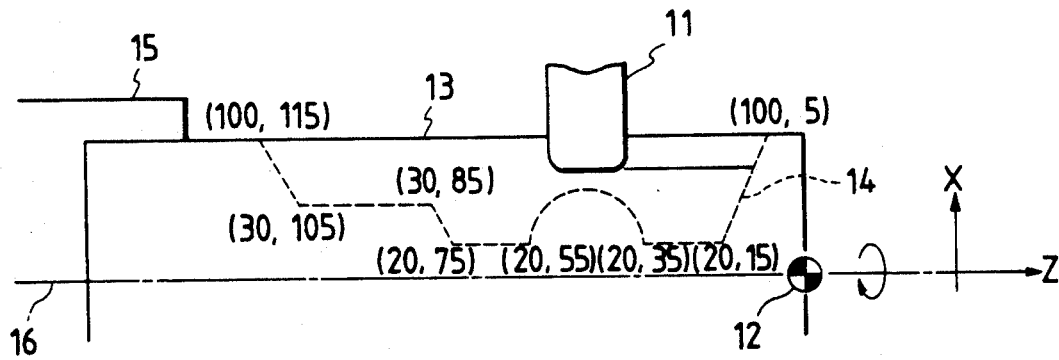
FIG. 3
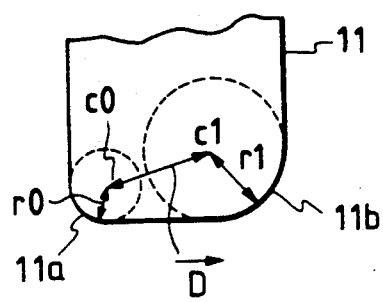
FIG. 4
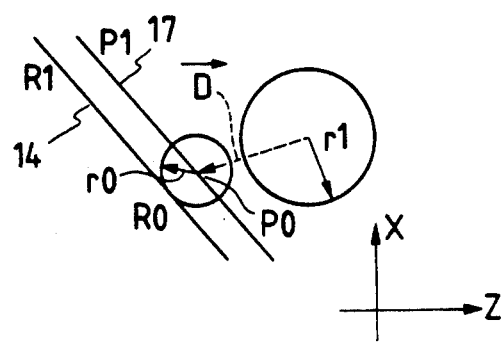
FIG. 5

FIG. 18
| NEXT BLOCK<br>PRESENT BLOCK | θ2 ≤ θ | 2 > θ |
|---|---|---|
| θ1 ≤ θ | L→L | L→R |
| θ1 > θ | R→L | R→L |
FIG. 19
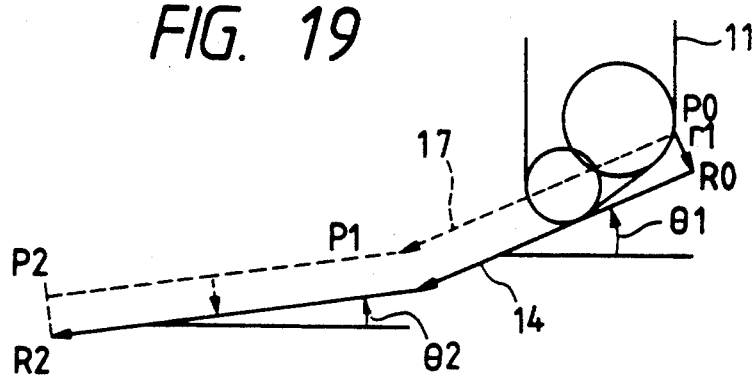
FIG. 20
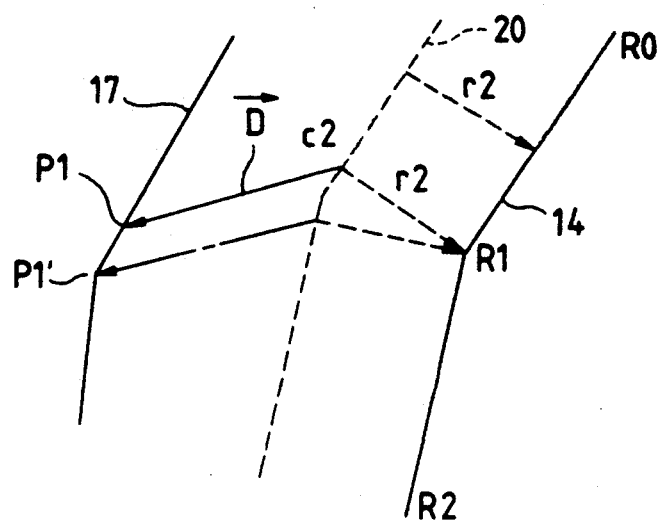

OFFSET CONFIGURATION FORMING METHOD

TECHNICAL FIELD

This invention relates to a method of forming an offset configuration for a cutting tool used under the control of a numerical control device which performs a cutting operation, and more particularly to a method of forming an offset configuration for a cutting tool having edges on both sides which have nose radii.

BACKGROUND ART

One example of a tool which is used for a cutting operation and has edges on both sides is a grooving tool. FIG. 30 shows the end portion of a conventional grooving tool 31. As is apparent from FIG. 30, the grooving tool has edges on both sides, and the end portions of the edges have the same tip radius r. In cutting a workpiece with the grooving tool 31, a phantom tip point 32 is provided at the end of one of the edges; that is, the cutting operation is carried out with the phantom tip point as a control point. For instance in the case where, as shown in FIG. 31, a final machining configuration 33 is formed with the left phantom tip point 32 as the control point as shown in FIG. 30, first a machining configuration 34 is formed which is obtained by reducing the width of the final configuration as much as the width of the tool, and then the tool 31 is moved along the offset configuration 35 which is formed by adjusting the machining configuration 34 as much as the tip radius of the edge.

For a cutting tool having edges on both sides which are different in tip radius, there has been provided no method of forming an offset configuration which is determined taking the tip radius into account. Therefore, in the case where a work-piece is cut with a machine tool operated under the control of a numerical control device (hereinafter referred to merely as "an NC machine", when applicable), a cutting tool 36 is used which, as shown in FIG. 32, has an edge on one side.

In FIG. 32, reference numeral 13 designates a cylindrical workpiece to be cut; 14, a final machining configuration; 15, a chuck; and 16, the central axis of rotation. The workpiece 13 is cut as follows: While the workpiece 13 is being rotated, the cutting tool 36 is moved in a horizontal direction, or in a Z-axis direction, and in a vertical direction, or in an X-axis direction. In this cutting operation, the final machining configuration is modified into a configuration which can be formed with the tip angle of the cutting tool 36.

A method of forming an offset configuration for the cutting tool 36 will be described with reference to FIG. 33 which is an explanatory diagram. In FIG. 33, line (R0-R1-R2-R3-R4-R5-R6-R7-R8) is the final machining configuration. In forming the configuration 37 with the cutting tool 36 which is obtained by adjusting the line according to the tip angle of the cutting tool 36, the center c3 of the tip radius of the cutting tool is utilized to control the movement of the cutting tool 36. Accordingly, the line (P0-P1-P2-P3-P4-P5-P6-P6-P7-P8-P9-P10) which is obtained by shifting the aforementioned line 37 as much as the tip radius r3 of the cutting tool 36 is the offset configuration which is the locus of the control center of the cutting tool 36.

A method of processing data in forming the offset configuration 38 (P0-P1 ... P10) to control the cutting tool 36 according to the final machining configuration 14 (R0-R1 ... R8) will be described with reference to a flow chart shown in FIG. 34.

First, parts (R0-R1-R2) and (R3-R4-R5) of the final machining configuration are modified into configurations (R0-Q0-R2) and (R3-Q1-R5) which can be formed with the tip angle of the cutting tool (Step S31). Then, the point P0 which is vertically away from the start point R0 as much as the tip radius r3 is obtained, and it is employed as a start point block (Step S32). All configuration blocks including the start point (R0) block have a data structure as shown in FIG. 35.

The flag region of the data structure stores data indicating whether or not the block is of the final machining configuration, and data indicating whether it is a start point, or a straight line, or an arc. In the case where the block is a start point, the coordinates of the start point are stored in the X and Z areas; and in the other cases, the coordinates of the final point are stored therein. For instance for the block (R0-Q0), the coordinates of the point Q0 are written therein. When the configuration is an arc, the coordinates of the center of the arc are written in regions CX and CZ, and the radius is written in a region R. The above-described data structure 39 is stored, as a series of blocks 39a through 39n in memory as shown in FIG. 36.

After the data processing of the start point R0, the data processing of the next block 39b is started. In the data processing, first the configuration of the block 39b is detected (Step S33), and it is determined from the flag region whether or not the block is of the final configuration (Step S34). When the block is not of the final configuration, an offset configuration to the final point for the cutting tool is formed (Step S35). For instance in the case of the block 39b indicating the part (R0-Q0), the data block of an offset configuration (P1) which is shifted as much as the tip radius from the point Q0 is formed, and the data block thus formed is written after the offset configuration data block train which has been formed before (Step S36). The above-described operation is successively carried out until the final configuration is obtained. As a result, the data block train of the offset configuration 38 which is the locus of the control center of the cutting tool 36 is formed. Thus the data processing operation has been ended. The movement of the cutting tool 36 is controlled according to the data of the offset configuration data block train thus formed, to form the configuration (R0-Q0 ... R8) 37.

As was described above, with the conventional NC machine, it is necessary to change the parts (R0-R1-R2) and (R3-R4-R5) of the final machining configuration into (R0-Q0-R2) and (R3-Q1-R5) according to the tip angle of the cutting tool; that is, it is necessary to perform a so-called "tip configuration correction", as a result of which, in FIG. 37, the parts (R0-R1-Q0-R0) and (R3-R4-Q1-R3) are left uncut. The parts thus left uncut must be cut with another cutting tool. Accordingly, it takes labor and time to calculate the configurations of the parts, and to cut the parts.

In the above-described method, the offset configuration is determined based on the one tip radius of the cutting tool 36. Therefore, the method is not applicable to the formation of an offset configuration for controlling the position of the offset tool which has two nose radii and cuts with both sides, and accordingly the NC machine cannot use a cutting tool having edges on both sides; that is, it cannot machine a workpiece with high efficiency.

DISCLOSURE OF THE INVENTION

Accordingly, an object of this invention is to eliminate the above-described difficulties. More specifically, an object of the invention is to provide a method of forming an offset configuration which provides an offset configuration for a cutting tool having edges on both sides.

The method of forming an offset configuration according to the invention is applicable to the case where a tool having first and second edges on both sides which have nose radii, respectively, are used in such a manner that the tool is moved horizontally and vertically with respect to a rotating workpiece, and the first edge is used when a machining configuration increases in vertical coordinate, and the second edge is used when a machining configuration decreases in vertical coordinate, and to the case where a cutting tool having first and second edges on both sides which have nose radii, respectively, and provide a predetermined inclination angle $\theta$ is used in such a manner that the tool is moved horizontally and vertically with respect to a workpiece, rotating and the first edge is used when the inclination angle, in a vertical direction, of a machining configuration is smaller than the inclination angle $\theta$, and the second edge is used when the inclination angle, in a vertical direction, of a machining configuration is larger than the inclination angle $\theta$. The method includes the following procedures:

(a) when said workpiece is machined with said first edge, an offset configuration is formed which is shifted from a final machining configuration as much as the radius of the tip of said first edge, (b) when said workpiece is machined with said second edge, an offset configuration is formed which is shifted from a final machining configuration as much as the radius of the tip of said second edge and shifted as much as the vector which connects the centers of the radii of the tips of said first and second edges, (c) when said first edge is switched over to said second edge in use, before and after the switching point of a final machining configuration, offset configurations are obtained, and connected to form an offset configuration for the switching point, and (d) when said second edge is switched over to said first edge in use, before and after the switching point of a final machining configuration, offset configurations are obtained, and connected to form a closed loop, and said closed loop is removed to form an offset configuration for the switching point.

BRIEF DESCRIPTION OF THE DRAWINGS

FIG. 2 is an explanatory diagram showing a machining program in the embodiment.

FIG. 3 is an explanatory diagram showing a final machining configuration in the embodiment.

FIG. 4 is a front view showing the end portion of a cutting tool used in the embodiment.

FIGS. 5 through 10 are explanatory diagrams for a description of the principle of forming offset configurations in the embodiment.

FIG. 18 is an explanatory diagram showing the switching of the right and left nose radii of the cutting tool shown in FIG. 15.

FIGS. 19 through 26 are explanatory diagrams for a description of the principle of forming offset configurations for the above-described cutting tool.

BEST MODE FOR CARRYING OUT THE INVENTION

Figure 1:
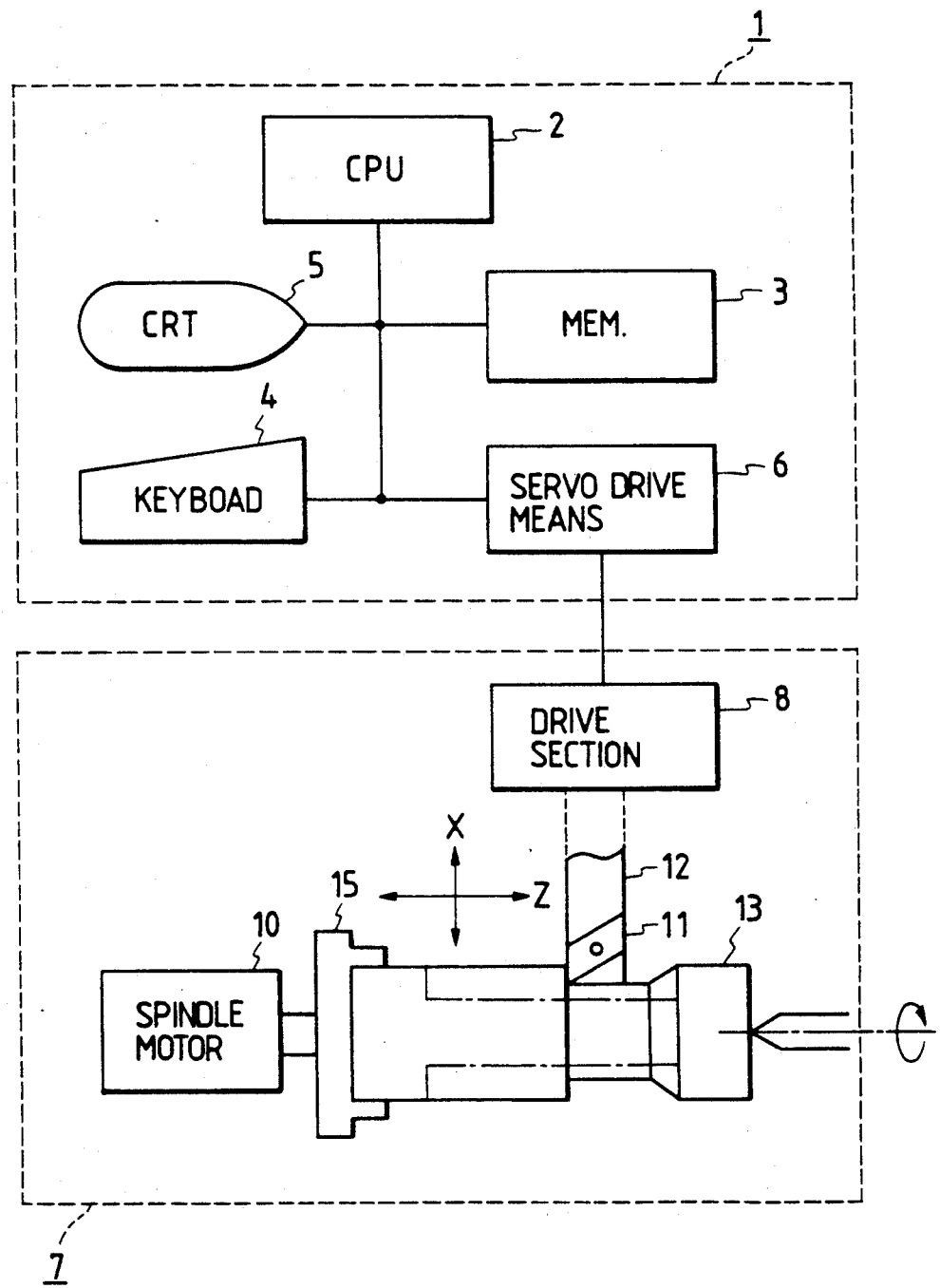
FIG. 1 is a block diagram showing the arrangement of an apparatus for practicing an offset configuration forming method which is a first embodiment of this invention.

A method of forming an offset configuration, which is a first embodiment of this invention, will be described. FIG. 1 is a block diagram showing an apparatus for practicing the method according to the invention. In FIG. 1, reference numeral 1 designates a numerical control device; 2, a CPU; 3, a memory in which a system program and a machining program have been stored; 4, input means, namely, a keyboard; 5, a CRT; and 6, a servo drive means comprising an axial movement control section and a servo amplifier.

Further in FIG. 1, reference numeral 7 designates a lathe controlled by the numerical control device 1: 8, a drive section having two servo motors which, in response to a control signal from the servo drive means 6, independently moves a cutting tool 11 in the direction of rotation, or in a Z-axis direction, and in a direction perpendicular to the direction of rotation, or in an X-axis direction, respectively; 10, a spindle motor for rotating a workpiece 13 through a chuck 15; 11, the aforementioned cutting tool having edges on both sides; and 12, a tool holder for holding the cutting tool 12.

For the NC machine thus organized, a machining program using a cutting tool having nose radii on both sides is formed as follows: As shown in FIG. 2, a program picture 5a indicating the kind of machining, the kind of tool and a configuration to be formed is displayed on the CRT 5. For instance, "lathe turning" is indicated as the kind of machining, and "nose R values" which are the right and left tip radii of a cutting tool are indicated as the kind of tool. In addition, as for the machining configuration, whether the final machining configuration is of a straight line or an arc, and the coordinates on the X-axis vertically of the program original point and on the Z-axis horizontally of the program original point, and in the case of an arc, its radius are indicated.

Figure 35:
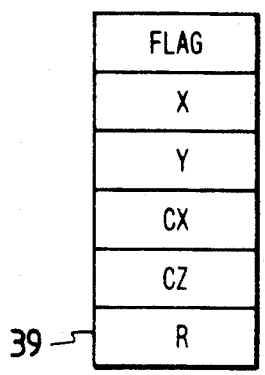
FIGS. 35 and 36 are explanatory diagrams showing a machining program data structure.
Figure 36:
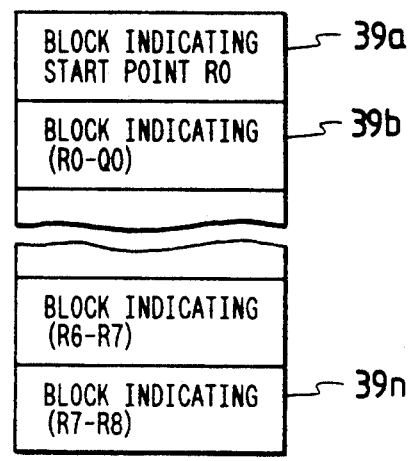
Figure 37:
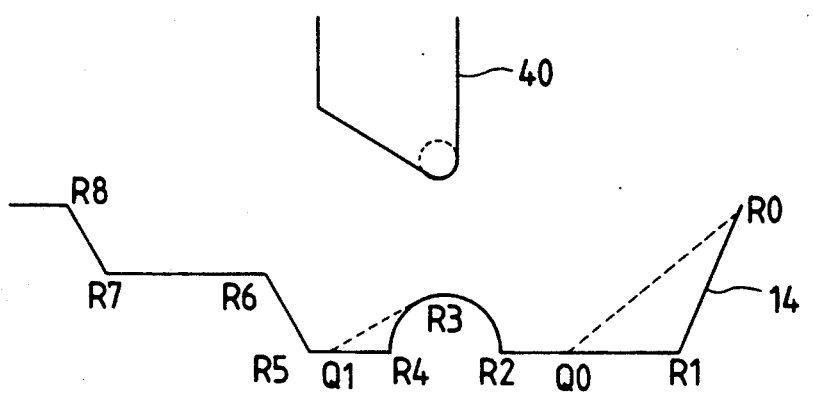
FIG. 37 is an explanatory diagram for a description of a machining operation which is additionally carried out in the conventional method.

Referring to the input picture displayed, as the program picture 5a, on the CRT 5, the data structures of the final machining configuration 14 of the workpiece 13 are formed as shown in FIG. 3, and they are stored, as a machining program comprising a train of blocks, in the memory 3. The data structures and the train of blocks are similar to those described before; that is, they are as shown in FIGS. 35 and 36. In FIG. 3, reference numeral 12 designates a program original point; and (100, 5), (20, 15) and so forth, the coordinates of various points of the final machining configuration in the X-Z coordinate system.

FIG. 4 shows the end portion of the cutting tool 11 having edges on both sides. The cutting tool 11 has a left nose R 11a having a nose R value of r0, and a right nose R 11b having a nose R value of r1. The nose R values r0 and r1 are different; for instance r0<r1. In FIG. 4, the straight line connected between the nose R center c0 of the left nose R 11a and the nose R center c1 of the right nose R 11b has a vector value $\bar{D}$.

Now, the principle of forming an offset configuration in the case where the cutting tool 11 is controlled with the left nose R center c0 as a reference will be described with reference to FIGS. 5 through 10.

Figure 6:
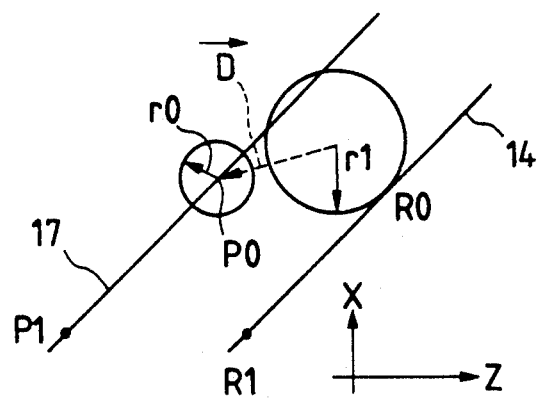

The following processes are provided for movement of the cutting tool 11:

(A) A process in the case where, as the final machining configuration is horizontal, the cutting tool 11 is moved only in the horizontal direction, or in the Z-axis direction (hereinafter referred to as "a horizontal process", when applicable), (B) A process in the case where, as the final machining configuration (R0–R1) increases in X-coordinate as shown in FIG. 5, the X-coordinate is increased as the cutting tool moves in the Z-axis direction (hereinafter referred to as "an increase process", when applicable), (C) A process in the case where, since the final machining configuration (R0-R1) decreases in X-coordinate as shown in FIG. 6, the X-coordinate is increased as the cutting tool is moved in the Z-axis direction (hereinafter referred to as "a decrease process", when applicable), and Other processes provided by combining the above-described processes.

Let us consider the case where the cutting tool 11 having the right and left nose radii 11a and 11b is used to machine a workpiece 13. In the increase process shown in FIG. 5, the left nose R 11a is used; and in the decrease process shown in FIG. 6, the right nose R 11b is used. In the horizontal process, the nose R which has been used in the preceding process is used as it is. More specifically, if the preceding process is the increase process, the horizontal process is carried out with the left nose R 11a; and if the preceding process is the decrease process, the horizontal process is carried out with the right nose R 11b.

Accordingly, in order to switch the increase process over to the decrease process, and in order to switch the horizontal process following the increase process over to the decrease process, the left nose R 11a must be switched over to the right nose R 11b in use. Similarly, in order to switch the decrease process over to the increase process, or in order to switch the horizontal process following the decrease process over to the increase process, the right nose R 11b must be switched over to the left nose R 11a in use.

Even in the case where the workpiece 13 is machined while the nose radii 11a and 11b are being switched over in the above-described manner, the cutting tool 11 must be used with the control point fixed. If the control point of the cutting tool 11 is the left nose R center c0, then the configuration for controlling the cutting tool 11 is the locus of the left nose R center c0 provided when the cutting tool 11 is moved.

Therefore, in the case where, as shown in FIG. 5, the final machining configuration (R0-R1) is increased in X-coordinate, the offset configuration for the cutting tool 11 in the increase process can be determined by shifting the final machining configuration as much as the left nose R value r0.

In the case where, as shown in FIG. 6, the final machining configuration (R0-R1) is decreased in X-coordinate, an offset configuration is formed by shifting the final machining configuration by the right nose R value r1, and the offset configuration thus formed is shifted as much as the vector D which connects the right and left nose R centers c1 and c0 in FIG. 4, thus providing an offset configuration (P0-P1). Thus, the control configuration for the cutting tool 11 in the decrease process has been obtained.

Now, a method of forming, in the case where a cutting operation is carried out with the right and left nose radii 11a and 11b switched over to each other, an offset configuration for the cutting tool 11 at the switching point will be described.

Figure 7:
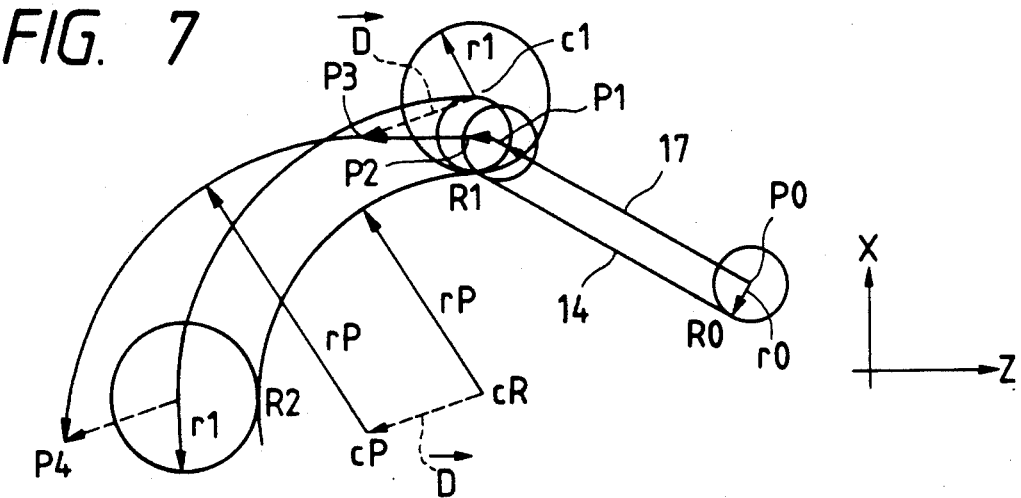

Let us consider the case where, as shown in FIG. 7, a first final machining configuration (R0-R1) is formed by the increase process, and a second final machining configuration (R1-R2) is an arc of radius rR with radius at cR: that is, it is formed by the decrease process. In this case, the first final machining configuration (R0-R1) is formed with the left nose R 11a of the cutting tool 11, and the second final machining configuration (R1-R2) is formed with the right nose R 11b. With respect to the switching point R1 of the right and left noses, the tip's offset configuration is (P1-P2-P3). The point P1 is shifted, at the switching point R1, vertically from the final machining configuration (R0-R1) as much as the left nose R value r0; the point P2 is shifted, at the switching point R1, in the X-axis direction, as much as the left nose R value r0, and therefore the offset configuration (P1-P2) is an arc having its center at R1 and a radius r0. The point P3 is shifted from the nose R center c1 as much as the vector $\bar{D}$ which is spaced, in the X-axis direction, from the switching point R1 as much as the right nose R value r1. Therefore, the offset configuration (P2-P3) is a straight line connecting the points P2 and P3. In this case, the offset configuration (P3-P4) of the arc (R1-R2) is such that the center of the arc is the point CP which is shifted from the center cR of the arc (R1-R2) as much as the vector $\bar{D}$, and the radius rp is equal to (rP+r1). The resultant line (P0-P1-P2-P3-P4) is the offset configuration for the cutting tool 11.

Figure 8:
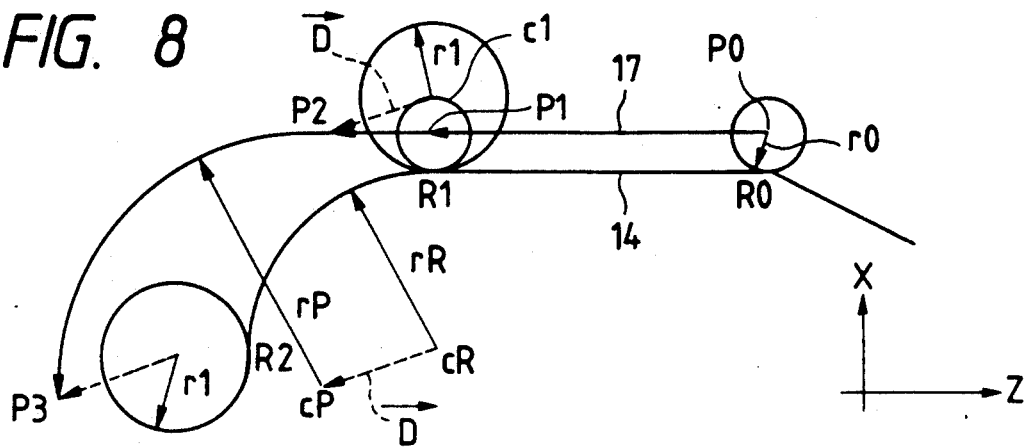

In the case, too, where, as shown in FIG. 8, the horizontal process (R0-R1) following the increasing process is switched over to the decrease process (R1-R2), the tip's offset configuration with respect to the switching point R1 can be formed as the line (P1-P2) similarly as in the case of FIG. 7.

Figure 9:
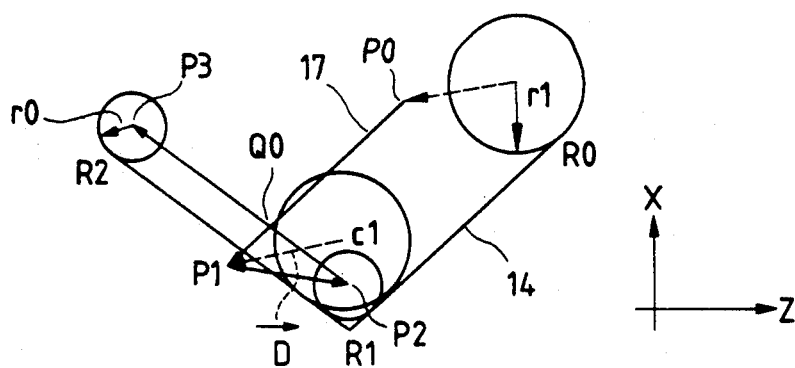

In the case where, as shown in FIG. 9, a first final machining configuration (R0-R1) is formed by the decrease process, and a second final machining configuration (R1-R2) is formed by the increase process, the first final machining configuration is formed with the right nose R 11b of the cutting tool, and the second final machining configuration is formed with the left nose R 11a. The tip's offset configuration with respect to the right and left nose Rs 11b and 11a is (P1-P2-Q0). The point P1 is shifted as much as the vector $\bar{D}$ from the right nose R center c1 located when the circle whose radius is the right nose R value r1 is brought into contact with the first and second final machining configurations. The point P2 coincides with the left nose R center c0 located when the circle whose radius is the left nose R value r0 is brought into contact with the first and second final machining configurations (R0-R1) and (R1-R2). In the resultant line (P0-P1-P2-P3), the straight lines (P0-P1) and (P2-P3) intersect each other at the point Q0: that is, (Q0-P1-P2-Q0) forms a closed loop. With the closed loop omitted, the resultant line (P0-Q0-P3) is the offset configuration for the cutting tool 11.

In the case, too, where the horizontal process (R0-R1) following the decrease process is switched over to the increase process (R1-R2), similarly as in the case of FIG. 9, the points P1 and P2 are determined, and the closed loop (P2-P1-P2) is eliminated, to obtain the offset configuration (P0-P2-P3) for the cutting tool 11.

A method of forming an offset configuration in the case where the NC device as shown in FIG. 1 with the cutting tool 11 of FIG. 4 is used to form the final machining configuration 14 shown in FIG. 3 with the left nose R center c0 as a reference will be described with reference to the explanatory diagram of FIG. 11 and a flow chart in FIG. 12.

Figure 10:
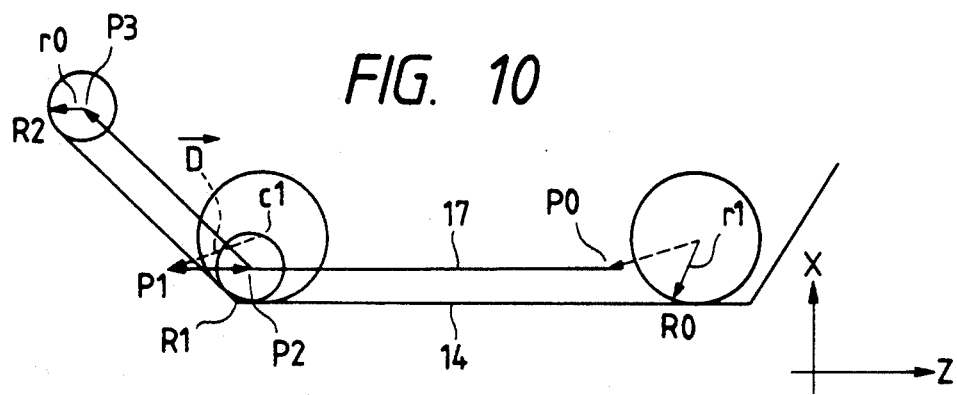
Figure 11:
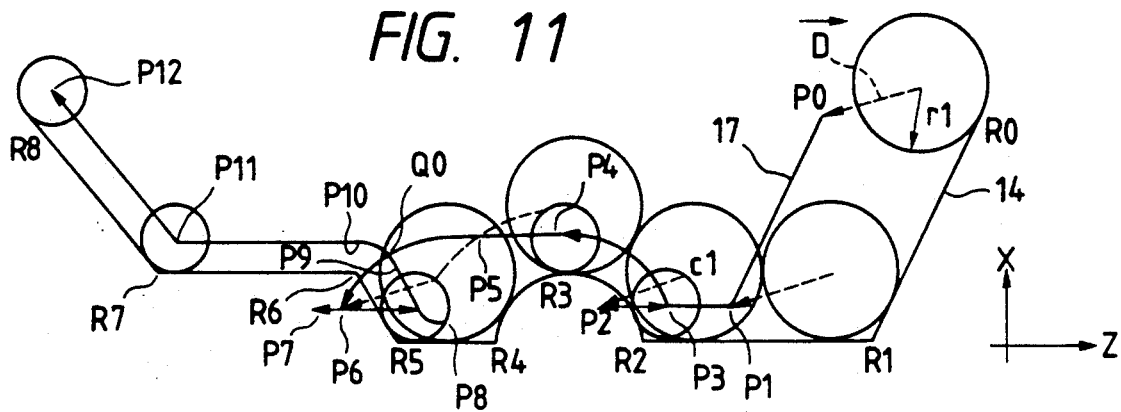
FIG. 11 is an explanatory diagram for a description of the formation of offset configurations for a cutting tool with respect to the final machining configuration shown in FIG. 3.
Figure 12:
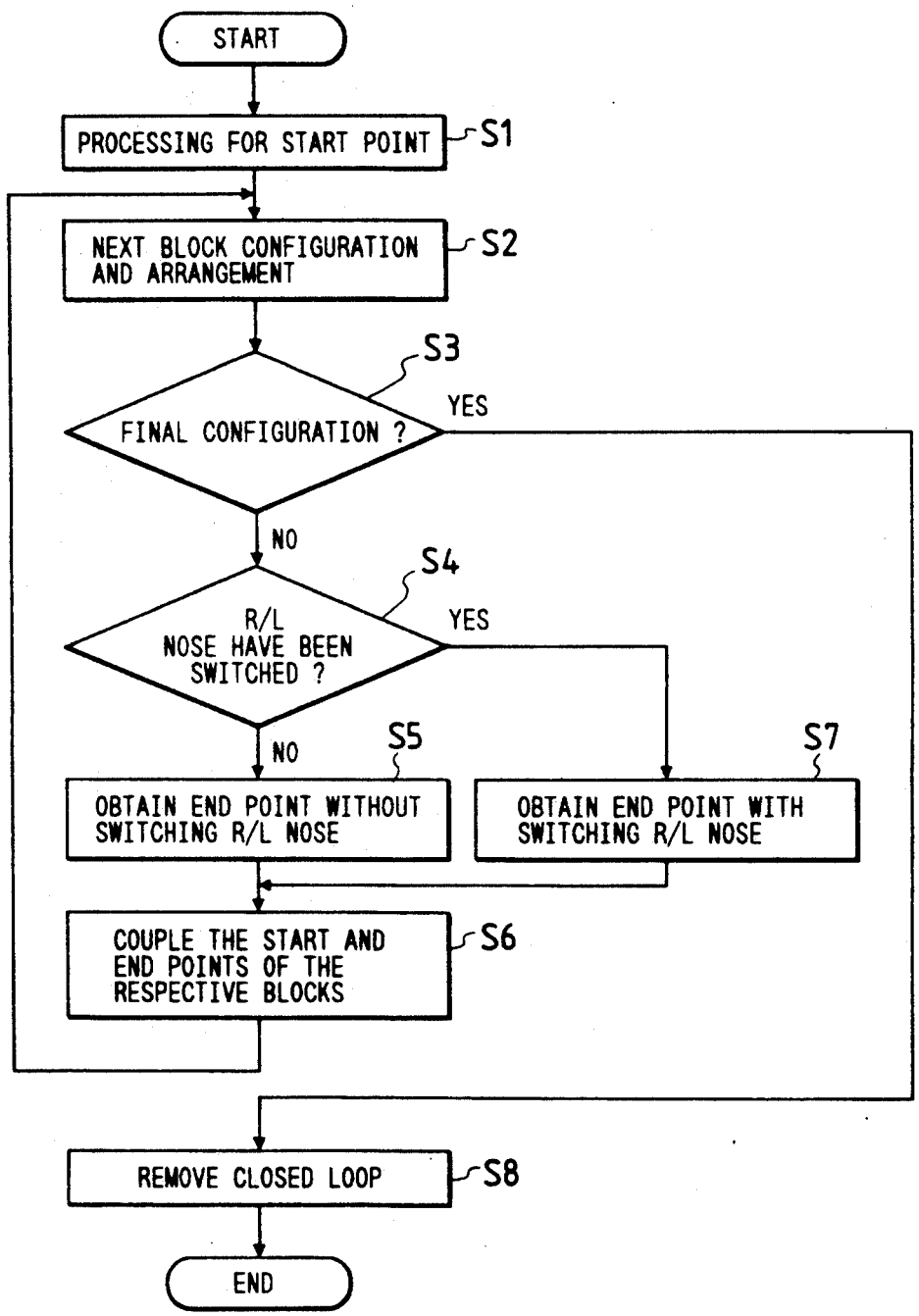
FIG. 12 is a flow chart for a description of data processing operations in the formation of the offset configurations shown in FIG. 11.
Figure 13:
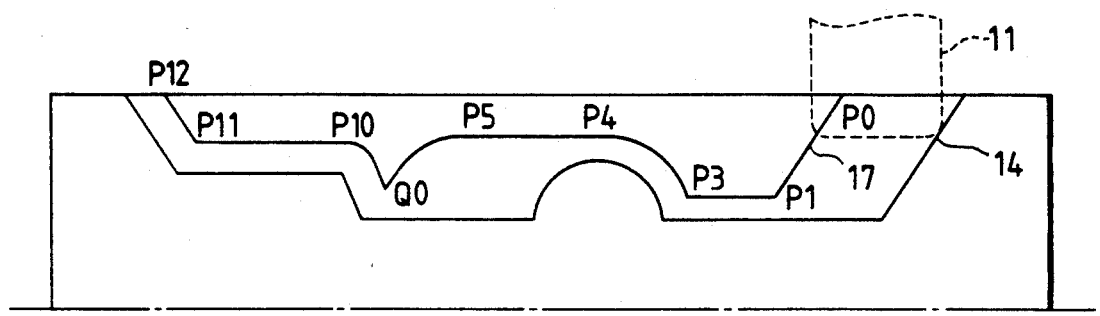
FIG. 13 is an explanatory diagram showing a control configuration for the cutting tool in the embodiment.

It is assumed that the final machining configuration 14 has been determined as (R0-R1-R2-R3-R4-R5-R6-R7-R8) as shown in FIG. 11. With respect to the final machining configuration 14, an offset configuration for the cutting tool 14 is obtained through tip configuration correction as follows: First, the data (cf. FIGS. 35 and 36) on machining configurations etc. indicated by the machining program of the final machining configuration 14 which has been stored in the memory 3 are applied to the CPU 2, and the following data processing operations are carried out:

In the CPU 2, the data processing operation for the start point P0 is carried out according to the data applied thereto (Step S1). In the case of FIG. 11, the first final machining configuration (R0-R1) is of the decrease process, and therefore the data processing operation of the start point R0 is carried out as follows: The start point is shifted as much as the right nose R value r1 and then shifted as much as the vector D, to obtain a point P0. The point P0 thus obtained is stored, as offset configuration start point block data, in an offset configuration file (not shown) in the memory 3. Thereafter, the data block of the second final machining configuration is detected (Step S2), and it is determined from the flag region of the data block whether or not it is of the final machining configuration (Step S3). When the block is not of the final machining configuration, the X-coordinates of the present block and two preceding blocks are detected, to determine whether or not the right and left nose radii have been switched (Step S4). In the case where, as in the case of the point R1, the right and left noses 11a and 11b are not switched, an end point P1 is obtained which is shifted as much as the nose R value of the cutting tool 11 with respect to the final machining configuration (R0-R1) with the nose radii not switched (Step S5), and the start point P0 and the end point P1 are connected with a straight line thereby to form the data block of the offset configuration (P0-P1) which is a tool control path. The data block thus formed is stored in the offset configuration file immediately after the previously stored data (Step S6). In the case of the point R2, the horizontal process is switched over to the increase process; that is, the right nose R 11b is switched over to the left nose R 11a. In this case, the tip switching operation is carried out as shown in FIG. 10 to obtain an end point P2 shifted as much as the nose R value (Step S7), and the start point P1 and the end point P2 are connected with a straight line, to form a data block for the offset configuration (P1-P2). Similarly as in the above-described case, the data block thus formed is stored in the offset configuration file (Step S6).

The above-described data processing operations are carried out repeatedly until the last configuration is obtained, so that a train of offset configuration data blocks (P0-P1-P2-P3-P4-P5-P6-P7-P8-P9-P10-P11-P12). The closed loops (P3-P2-P3), (P6-P7-P6) and (Q0-P6-P7-Q0) are removed from the train of data blocks of the offset configuration (P0-P1 . . . P12), to obtain a train of data blocks of the offset configuration (P0-P1-P3-P4-P5-Q0-P10-P11-P12) (Step S8). Thus, the data processing operation has been accomplished.

Figure 14:
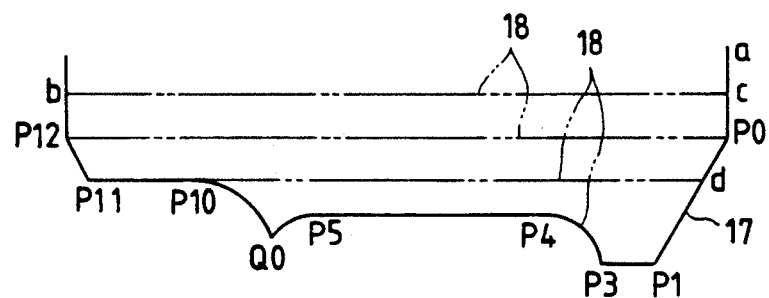
FIG. 14 is an explanatory diagram showing the paths of movement of the cutting tool in the embodiment.

Therefore, in the case where it is required to form the final machining configuration 14 with the cutting tool 11 having nose radii on both sides, the final machining configuration 14 can be formed with the right and left noses by moving the left nose R center c0 of the cutting tool 11 along the offset configuration 17. In this operation, as shown in FIG. 14, the left nose R center c0 of the cutting tool 11 is moved along the first path 18 of (a-P0-P12-b-c), then the second path 18 of (c-P0-d-P10-P11-P12-P0), and finally the third path 18 of (P0-P1-P3-P4-P5-Q0-P10-P11-P12).

In the above-described embodiment, the offset configuration of the cutting tool 11 is obtained with the left nose R center c0 of the cutting tool as a reference. However, it should be noted that the offset configuration can be obtained with the right nose R center c1 as a reference.

Now, another method of forming an offset configuration, which is a second embodiment of the invention, will be described.

Figure 15:
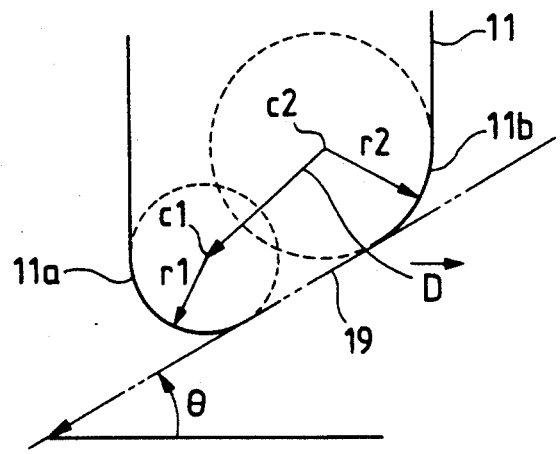
FIG. 15 is a front view showing the end portion of a cutting tool used in an offset configuration forming method which is a second embodiment of the invention.

FIG. 15 is an explanatory diagram showing the end portion of a cutting tool used in the second embodiment of the invention. The end portion of the cutting tool has right and left nose Rs 11b and 11a on both sides whose nose R values are r2 and r1, respectively. The straight line connecting the two nose radii forms an inclination angle $\theta$. In FIG. 15, reference character c1 designates the nose R center of the nose R 11a; c2, the nose R center of the nose R 11b; and $\bar{D}$, the vector connected between the nose R centers c1 and c2.

The principle of forming an offset configuration 17 with respect to a final machining configuration 14 will be described with reference to FIGS. 16 through 26. In the following description, the nose R center c1 of the left nose R 11a is employed for control of the movement of the cutting tool 11.

Figure 16:
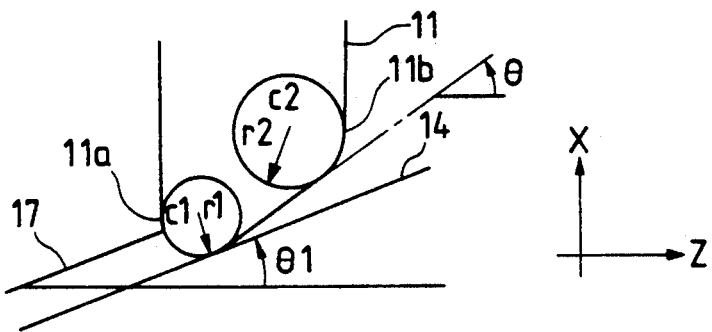
FIGS. 16 through 17 are explanatory diagrams for a description of machining operations with the cutting tool shown in FIG. 15.

In the case where a block of the final machining configuration is a straight line, it is assumed that the straight line forms an angle $\theta 1$ with the Z-axis extended in the same direction as the axis of rotation of the workpiece; and in the case where the block is an arc, it is assumed that the tangent to the arc forms an angle $\theta 1$ with the Z-axis. As shown in FIG. 16, the X-coordinate is decreased as the cutting tool 11 moves in the Z-axis direction. When $\theta 1 \leq \theta$, the cutting operation is carried out with the left nose R 11a of the cutting tool 11, and therefore the locus of the nose R center c1 is the offset configuration 17. In the case where $\theta 1 > \theta$, the right nose R 11b of the cutting tool 11 is used, and the cutting tool control point is the left nose R center c1. In this case, the configuration (locus) of the right nose R center c2 which is shifted as much as the right nose R value r2 from the final machining configuration 14 is obtained, and is shifted as much as the vector $\bar{D}$ connected between the two nose R centers c1 and c1, to form the offset configuration 17.

As is apparent from the above description, it is necessary to switch the nose radii 11a and 11b depending on the inclination angle $\theta i$ of each block of the final machining configuration and on the cutting tool angle $\theta$.

FIG. 18 is a diagram for a description of the switching of the noses 11a and 11b of the cutting tool 11 in the case where a block of a final machining configuration 14 has an inclination angle of $\theta 1$, and the next block has an inclination angle of $\theta 2$. In FIG. 18, the terms "right" and "left" are intended to mean the right nose R 11b and the left nose R 11a which are used for cutting, and the terms "right→left" and "left→right" are intended to means the switching of the right nose R to the left nose R, and the switching of the left nose R to the right nose R, respectively.

In the case where, as shown in FIG. 19, both the inclination angles $\theta 1$ and $\theta 2$ of a block (R0-R1) and the following block (R1-R2) of a final machining configuration 16 are smaller than the angle $\theta$ of the cutting tool 11, the two blocks are machined with the left nose R 11a. Therefore, in this case, the offset configuration 17 is formed with the tip radius; i.e., the nose R value r1. On the other hand, in the case where, as shown in FIG. 20, both the inclination angles $\theta 1$ and $\theta 2$ of a block (R0-R1) and the following block (R1-R2) of a final machining configuration are larger than the angle $\theta$ of the cutting tool 11, the two blocks are machined with the right nose R 11b. In this case, a correction configuration 20 is formed by using the nose R value r2 of the right nose R 11b, and it is shifted as much as the vector D between the nose R centers c1 and c2, to form an offset configuration 17. Thus, an offset configuration (P1-P1') is obtained for the end point R1 of the block (R0-R1).

Figure 21:
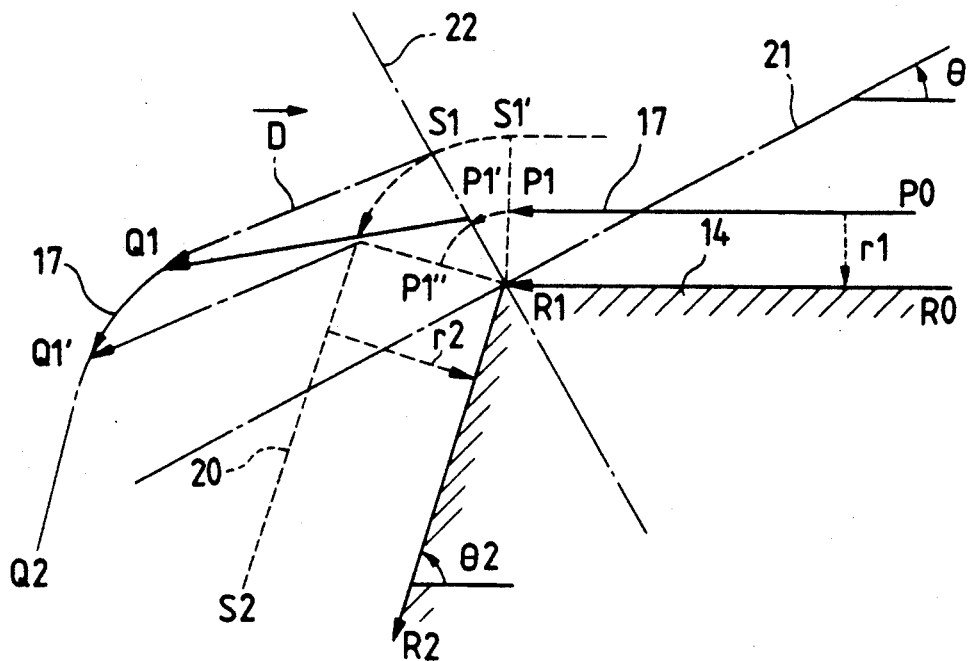

In the case where, as shown in FIG. 21, a final machining configuration 14 is protruded outwardly, and a block (R0-R1) is machined with the left nose R 11a, while the following block (R1-R2) is machined with the right nose R 11b because the inclination angle $\theta 2$ is smaller than the angle $\theta$ of the cutting tool, an offset configuration 17 for the end point R1 is obtained as follows:

First, the straight line 21 which passes through the end point R1 of the block and inclines as much as the angle $\theta$ of the cutting tool 11 is obtained, and the straight line 22 perpendicular to the straight line 21 is obtained. Thereafter, the nose R value r1 of the left nose R 11a is used to obtain an offset configuration (P0-P1-P1'') for the block (R0-R1), and the intersection P1' of the offset configuration and the straight line 22 is determined. Then, the nose R value r2 of the right nose R 11b is used to obtain a correction configuration (S1'-S2) 20 for the block (R1-R2). The intersection S1 of the correction configuration and the straight line 22 is determined. Thereafter, the correction configuration (S1-S2) extended from the point S1 is shifted as much as the vector D, to form an offset configuration (Q1-Q1'-Q2).

The offset configuration (P1') and the offset configuration (Q1) are connected with a straight line, as a result of which an offset configuration (P1-P1'-Q1-Q1') is obtained for the end point R1 of the block (R0-R1).

Figure 22:
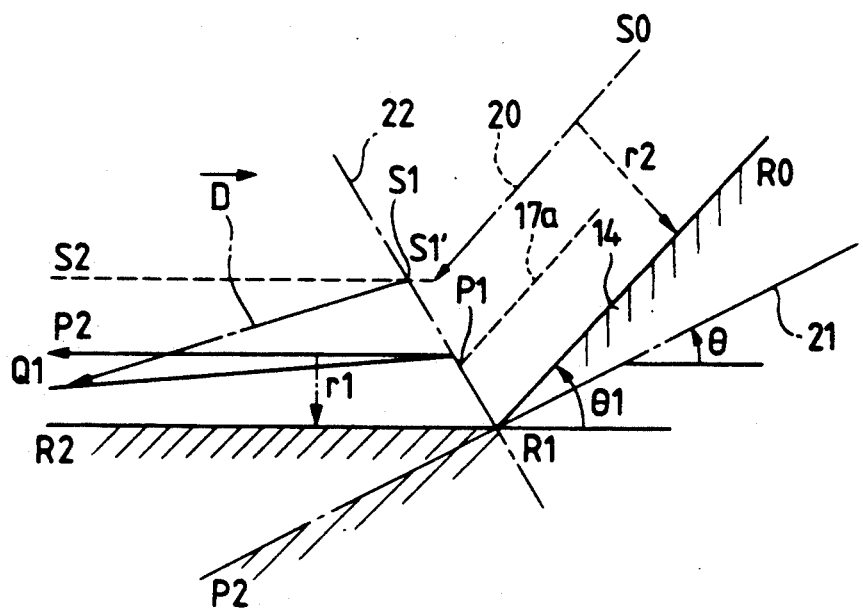

In the case where, as shown in FIG. 22, a final machining configuration is recessed, and the block (R0-R1) is machined with the right nose R 11b because the inclination angle $\theta 1$ thereof is larger than the angle $\theta$ of the cutting tool, while the following block (R1-R2) is machined with the left nose R 11b, an offset configuration for the end point P1 of the block (R0-R1) is obtained as follows:

The nose R value r2 of the right nose R 11b is used to obtain a correction configuration (S0-S1'-S2) 20 for a block (R0-R1) and the next block (R1-R2), and the intersection S1 of the correction configuration 20 and the straight line 22 is determined. The point S1 is shifted as much as the vector D to obtain an offset configuration (Q1). Thereafter, the nose R value r1 of the left nose R 11b is used to obtain an offset configuration (17a) for the two blocks (R0-R1) and (R1-R2), and the intersection P1 of the offset configuration (17a) and the straight line 22 is determined. By connecting the offset configurations (Q1) and (P1), an offset configuration for the end point R1 of the block (R0-R1) can be obtained.

Figure 23:
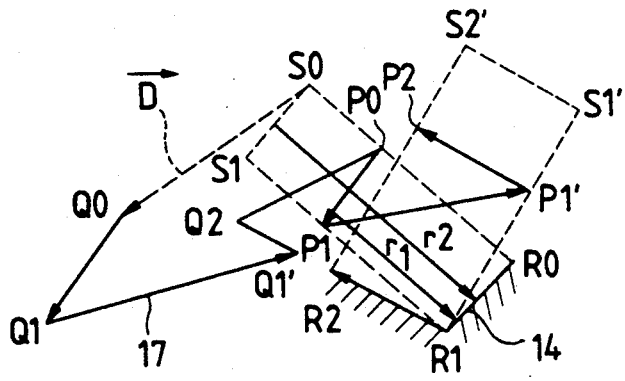

Let us consider the case where, as shown in FIG. 23, offset configurations (Q0-Q1) and (Q1'-Q2) which are obtained for a block (R0-R1) and the next block (R1-R2) of a final machining configuration 14 by using the nose R value r2 of the right nose R 11b and the vector D, do not intersect each other, and offset configurations (P0-P1) and (P1'-P2) which are provided for the blocks (R0-R1) and (R1-R2) by using the nose R value r1 of the left nose R 11a also do not intersect each other. In this case, the offset configurations (Q1) and (Q1'), (Q2) and (P0), and (P1) and (P1') are connected with straight lines, to form an offset configuration (Q1-Q1'-Q2-P0-P1-P1') 17 for the end point R1 of the block (R0-R1).

Figure 24:
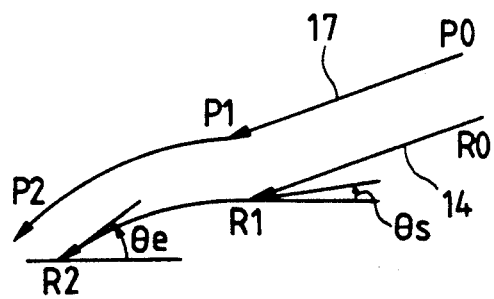
Figure 25:
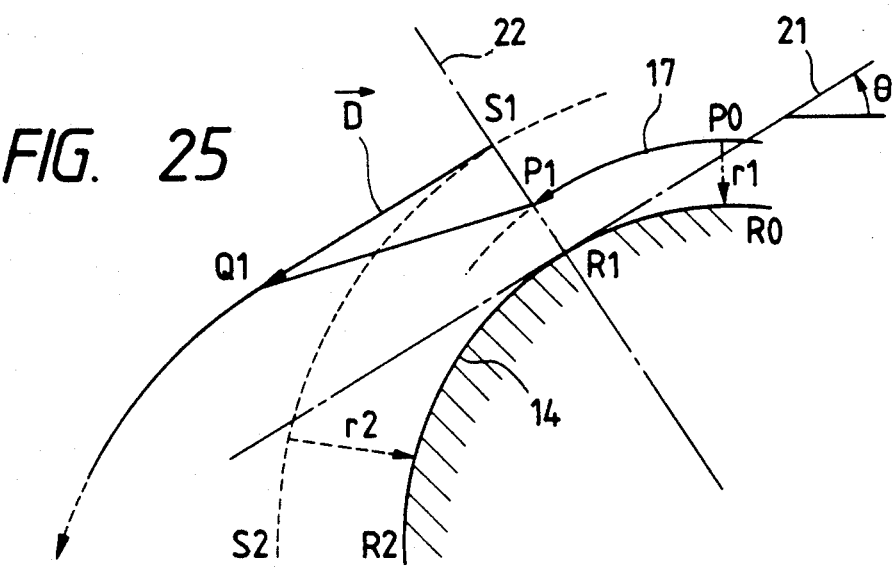

In the case where, as shown in FIG. 24, a block (R1-R2) of the final machining configuration 14 is an arc, the inclination angles $\theta s$ and $\theta e$ of the tangents to the start point R1 and the end point R2 of the arc are detected. When $\theta s \leq \theta$ and $\theta e \leq \theta$, or when $\theta s > \theta$ and $\theta e > \theta$, similarly as in the cases of the straight lines shown in FIGS. 19 and 20, an offset configuration (P0-P1-P2) 17 is obtained. In the case where, as shown in FIG. 25, the final machining configuration is an arc, and a block (R0-R1) is machined with the left nose R 11a, and the following block (R1-R2) is machined with the right nose R 11b, similarly as in the case of the straight line shown in FIG. 21, an offset configuration (P1-Q1) 17 is obtained for the end point R1 of the block (R0-R1).

Figure 26:
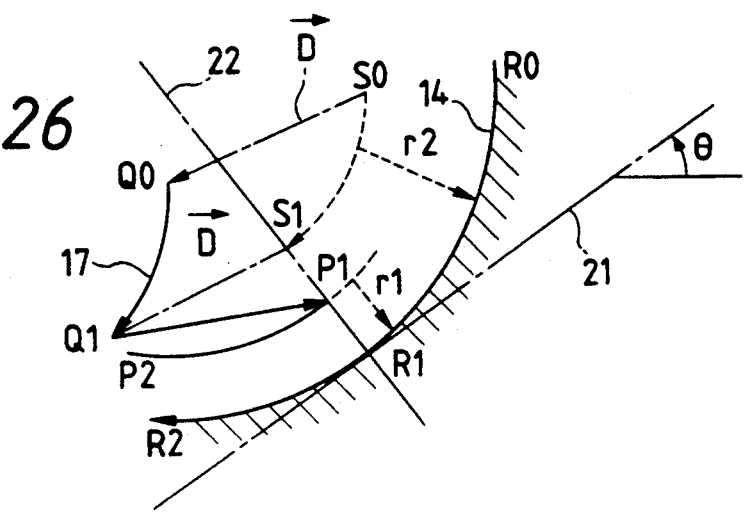

In the case where, as shown in FIG. 26, the final machining configuration 14 is an arc, and a block (R0-R1) thereof is machined with the right nose R 11b, and the following block (R1-R2) is machined with the left nose R 11a, similarly as in the case of the straight line shown in FIG. 22, an offset configuration (Q1-P1) 17 can be obtained for the end point R1 of the block (R0-R1).

Figure 17:
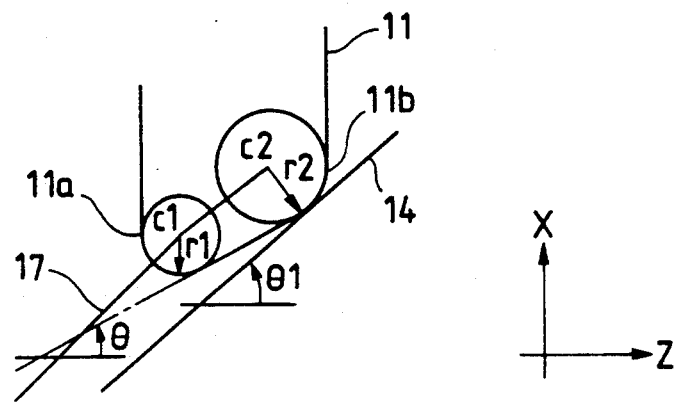

Now, a method of forming an offset configuration in the case where the lathe with the NC machine as shown in FIG. 1 and the cutting tool 11 as shown in FIG. 15 is used to form the final machining configuration of a workpiece 13 as shown in FIG. 17 with the nose R center c1 of the left nose R 11b will be described with reference to a flow chart of FIG. 18.

Data on the final machining configuration are inputted through the keyboard 4 of the NC machine, and stored in the memory 3.

In the case where the final machining configuration 14 is as shown in FIG. 17, the X-coordinates and the Y-coordinates of the points R0 through R11 of the final machining configuration 14 are stored in the X and Y regions of the data structures 39 (cf. FIG. 35), and for the blocks (R4-R5 and so on), the arc center coordinates Cx and Cz and arc radii r are stored. In addition, bits identifying start points, end points, straight lines and arcs are loaded in the mode regions.

In formation of an offset configuration according to the data of the final machining configuration 14 stored in the memory 3, first a preliminary data processing operation is carried out. That is, for each of the blocks such as the block (R2-R3) which cannot be machined with the cutting tool 11, being set back in the Z-axis direction, the point (R3) is shifted to another position (R31).

Next, which of the right and left nose Rs 11b and 11a should be used is determined according to the inclination angle $\theta 1$ of the block (R0-R1) following the start point R0 which is the first block of the train of blocks of the final machining configuration 14, and a data block for the offset configuration (P0) of the start point R0 is formed. The data block thus formed is stored in the offset configuration file (not shown) of the memory 3 (Step S1).

Figure 27:
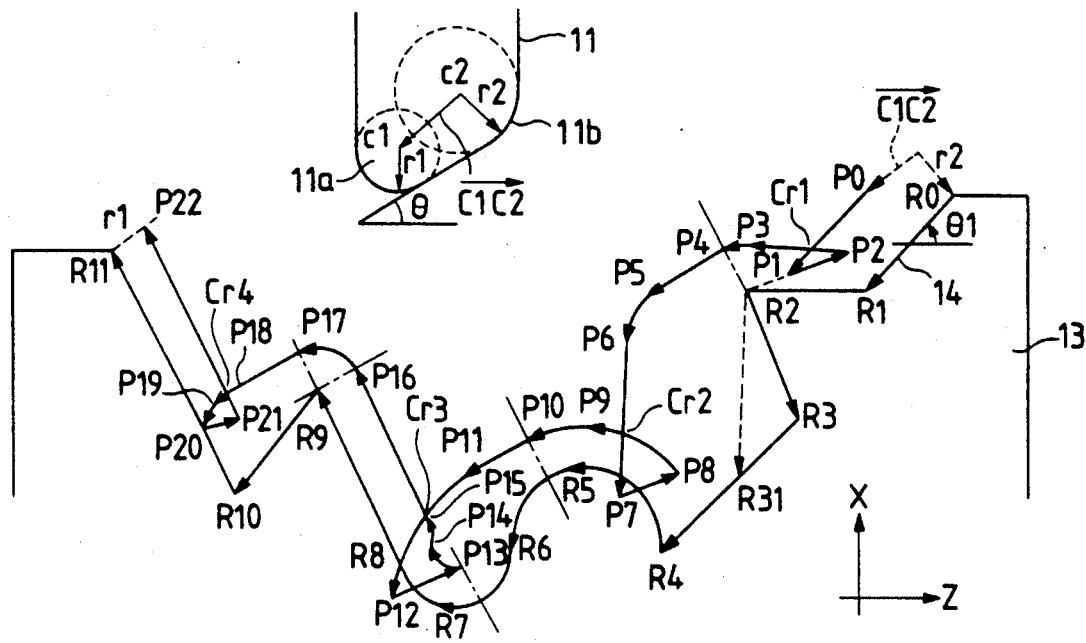
FIG. 27 explains the operation of the second embodiment.
Figure 29:
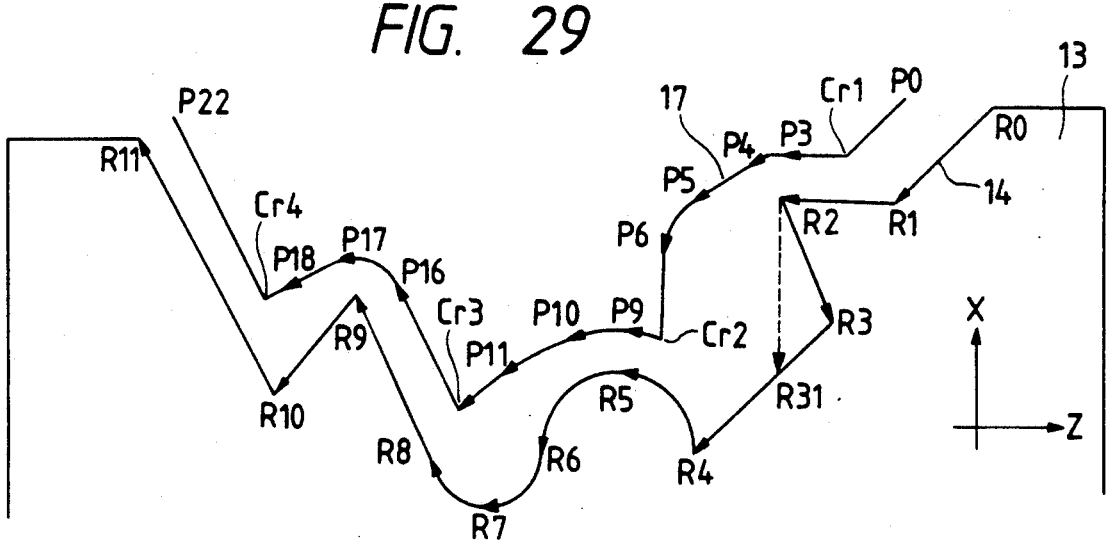
FIG. 29 is an explanatory diagram showing the offset configuration obtained in the second embodiment.
Figure 28:
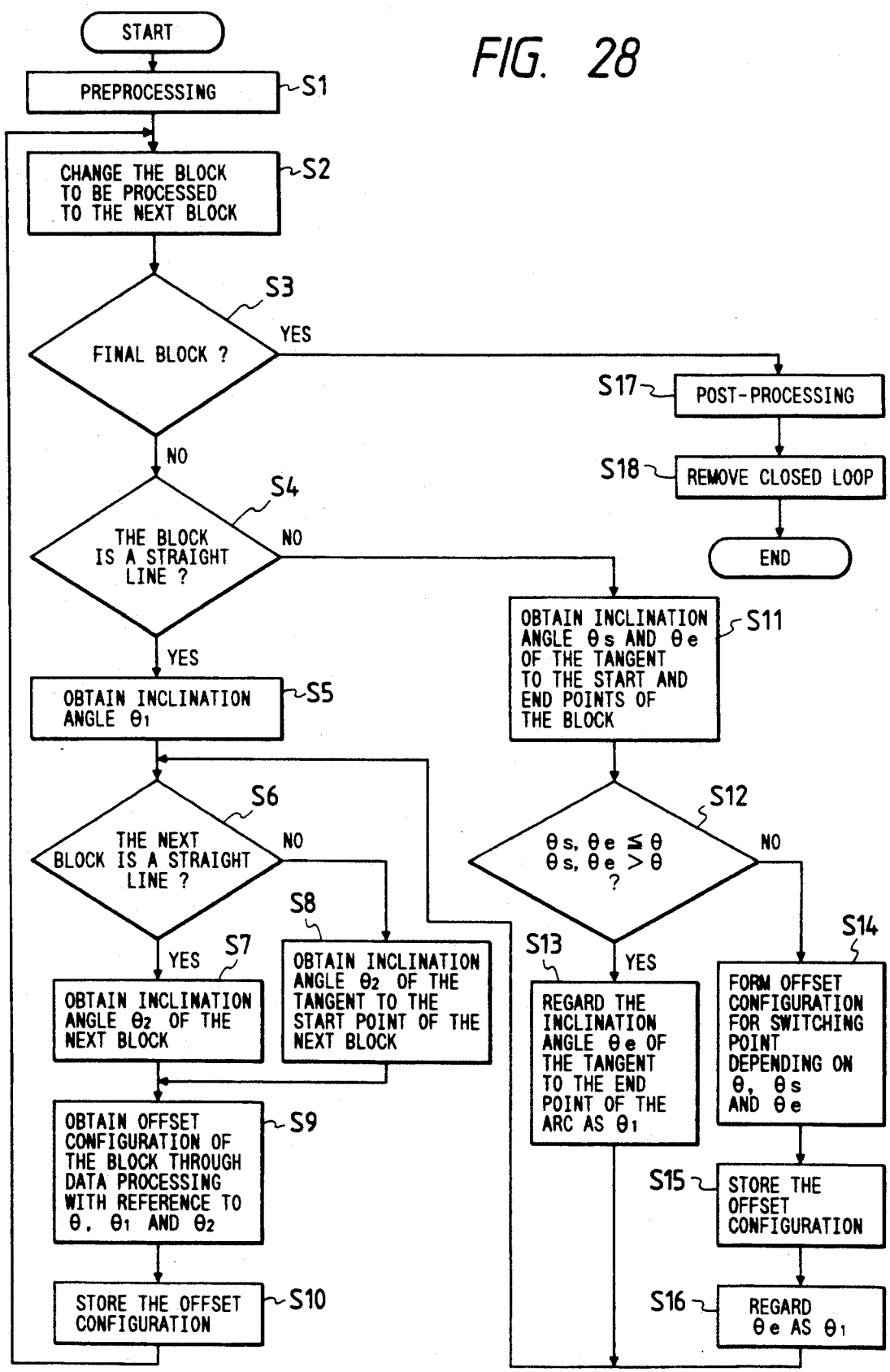
FIG. 28 is a flow chart for a description of the operation of the second embodiment.
Figure 30:
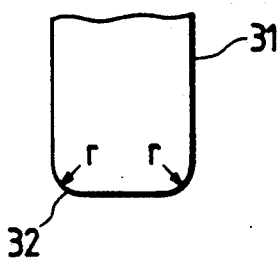
FIG. 30 is a front view showing the end portion of a conventional cutting tool having edges on both sides.
Figure 31:
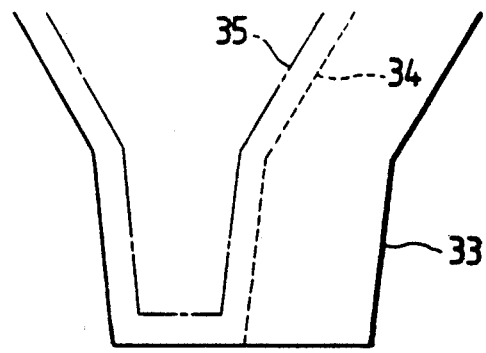
FIG. 31 is an explanatory diagram showing a control configuration for the cutting tool shown in FIG. 30.
Figure 32:
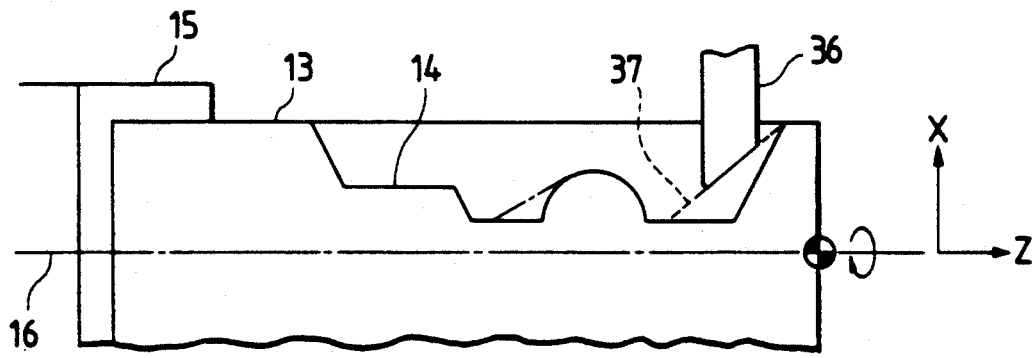
FIG. 32 is an explanatory diagram showing a final machining configuration in a conventional offset configuration forming method.
Figure 33:
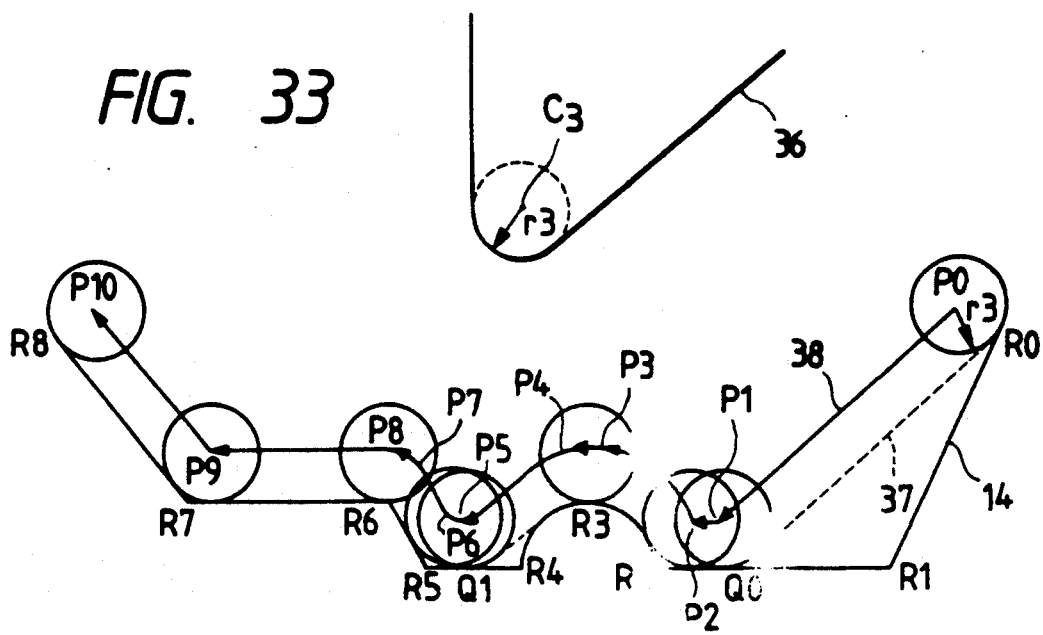
FIG. 33 is an explanatory diagram showing a control configuration for the cutting tool in the conventional method.
Figure 34:
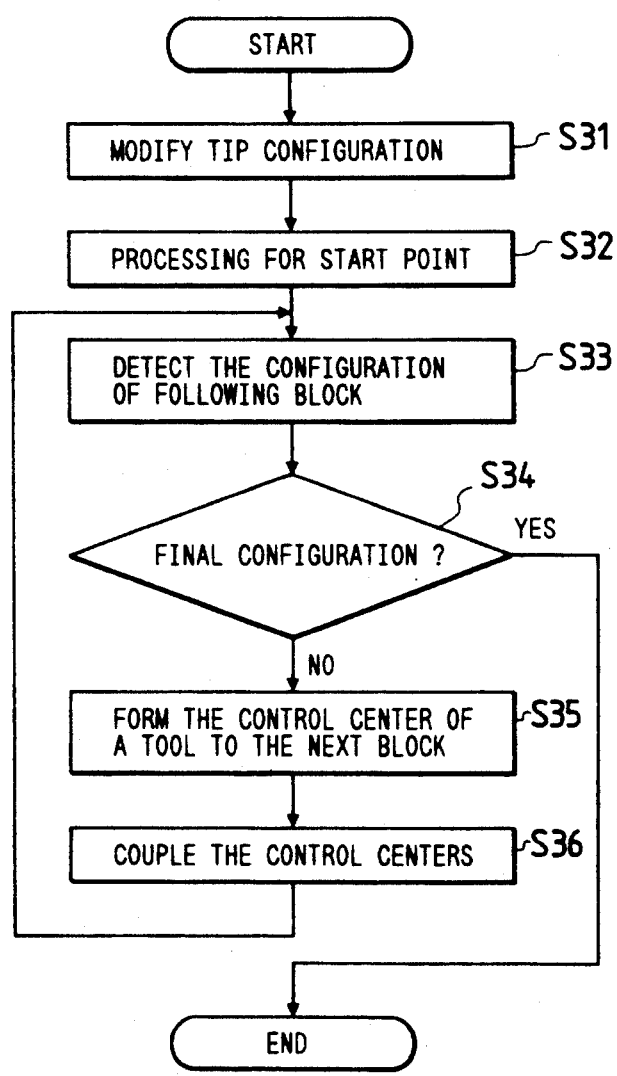
FIG. 34 is a flow chart for a description of the operation of forming the cutting tool control configuration shown in FIG. 18.

In the case of FIG. 27, the inclination angle $\theta 1$ is larger than the angle $\theta$ of the cutting tool 11, and therefore the right nose R 11b is used. Accordingly, an offset configuration (P0) for the start point R0 is shifted as much as the right nose R value r2 and shifted as much as the vector $\overline{D}$.

Thereafter, the next block (R0-R1) is selected for formation of the offset configuration (Step S2). Then, it is determined from the mode area of the data structure whether or not the block is the final block (Step S3). When the block (R0-R1) is not the final block as shown in FIG. 27, it is determined from the mode area of the data structure whether the block (R0-R1) is a straight line or an arc (Step S4). When the block is a straight line, its inclination angle $\theta 1$ is obtained (Step S5), and it is determined whether the next block (R1-R2) is a straight line or an arc (Step S6). When the block (R1-R2) is a straight line, its inclination angle $\theta 2$ is detected (Step S7). When the block (R1-R2) is an arc, the inclination angle $\theta 2$ of the tangent to the start point is obtained (Step S8). In the case of FIG. 27, the block (R1-R2) is a straight line, and therefore its inclination angle $\theta 2$ is obtained.

According to the inclination angles $\theta 1$ and $\theta 2$ thus obtained and the cutting tool angle $\theta$, it is determined whether or not the switching of the right and left nose Rs 11a and 11b is to occur. According to the results of this determination, the data processing operations described with reference to FIGS. 19 through 23 are selectively carried out so as to obtain the data block of the offset configuration (P0-P1) of the block (R0-R1) (Step S9). The data block thus obtained is stored in the offset configuration file immediately after the data filed before (Step S10). Thereafter, Step S2 is effected again, so that the following block (R1-R2) is selected, and the above-described operations are successively performed, to form the offset configuration.

When, in formation of the offset configuration, it is determined that the intended block is an arc as a block (R4-R5), the inclination angles $\theta s$ and $\theta e$ of the tangents to the start point and the end point of the arc are obtained (Step S11), and the inclination angles $\theta s$ and $\theta e$ are compared with the cutting tool angle $\theta$ (Step S12).

When $\theta s \leq \theta$ and $\theta e \leq \theta$, or $\theta s > \theta$ and $\theta e > \theta$, the inclination angle $\theta e$ of the tangent to the end point of the arc is regarded as $\theta 1$ (Step S13), and Step S6 is effected again, so that the data processing operations are carried out in the same manner to obtain an offset configuration (P8-P9). When $\theta s \leq \theta$ and $\theta e > \theta$ or $\theta s > \theta$ and $\theta e \leq \theta$, the switching of the nose Rs 11a and 11b is carried out to form the block. Therefore, depending on the inclination angles $\theta s$ and $\theta e$ and the cutting tool angle $\theta$, an offset configuration for the switching point is formed as was described with reference to FIGS. 25 and 26 (Step S14). The data block of the offset configuration thus formed is stored in the offset configuration file immediately after the data stored previously (Step S15). Thereafter, the inclination angle $\theta e$ of the tangent to the end point of the arc is regarded as $\theta 1$ (Step S16), and the data processing operations are carried out in the same manner.

As was described above, the offset configurations of all the blocks of the final machining configuration 14 are formed successively, and the data blocks of the offset configurations thus formed are stored successively in the offset configuration file. When a block of the final machining configuration 14 is determined as the last one in Step S3, then the post-processing of the end point R11 of the last block (R10-R11) is carried out (Step S17). In the post-processing operation, similarly as in the pre-processing operation, an offset configuration (P2) for the end point is obtained, and the data block of the offset configuration thus obtained is stored in the offset configuration file similarly as in the above-described case, thus forming a train of data blocks.

By connecting the offset configurations of the blocks of the final machining configuration 14, the train of data blocks of the offset configuration (P0-P2 ... P21-P22) is obtained. The offset configuration (P0-P2 ... P21-P22) includes closed loops. Therefore, the intersections Cr1, Cr2, Cr3 and Cr4 of the blocks of the closed loops are obtained, and the closed loops (Cr1-P1-P2-Cr1), (Cr1-P7-P8-Cr2), and so forth are removed, thus providing an offset configuration (P0-Cr1-P3-P4-P5-P6-Cr1 -P9-P10-P11-Cr3-P16-P17-P18-Cr4-P22) 17 used to form the final machining configuration 14 with the cutting tool 11 having the right and left nose radii 11a and 11b (Step S18).

In the above-described embodiment, the offset configuration 17 is obtained from the final machining configuration 14 with the left nose R center c1 as the control point. However, the right nose R center c2 may be employed as the control point to form an offset configuration for the machining of the workpiece with the right and left nose radii 11b and 11a.

First and second embodiments of the invention have been described with reference to a numerical control device with an automatic program input unit; however, it should be noted that the technical concept of the invention can be similarly applied to the case where configuration inputting is carried out by using EIA codes which are generally employed for NC machining programs.

As was described above, in the offset configuration forming method of the invention, one of the right and left nose R centers of the cutting tool is employed as the control point to form an offset configuration. Therefore, according to the invention, a machine tool operating under the control of a numerical control device can use a cutting tool with edges on both sides, to machine a workpiece. Furthermore, the use of a cutting tool having edges on both sides permits the machining of a workpiece in a reciprocation mode, which will reduce the machining time as much.

I claim:

1. A method of forming an offset configuration in the case where a tool having first and second edges on either side thereof, which have nose radii, respectively, are used in such a manner that the tool is moved horizontally and vertically with respect to a rotating workpiece, and said first edge is used when a machining configuration increases in vertical coordinate, and said second edge is used when a machining configuration decreases in vertical coordinate, wherein the method further comprises the steps of
    (a) when said workpiece is machined with said first edge, forming an offset configuration which is shifted from a final machining configuration by as much as the radius of the tip of said first edge,
    (b) when said workpiece is machined with said second edge, forming an offset configuration which is shifted from a final machining configuration by as much as the radius of the tip of said second edge and shifted by as much as a vector which connects the centers of the radii of the tips of said first and second edges,
    (c) when said first edge is switched over to said second edge in use, before and after the switching point of a final machining configuration, obtaining offset configurations and connecting said configurations to form an offset configuration for the switching point, and
    (d) when said second edge is switched over to said first edge in use, before and after the switching point of a final edge in use, before and after the switching point of a final machining configuration, obtaining offset configurations and connecting said configurations to form a closed loop, and then removing said closed loop to form an offset configuration for the switching point.

2. A method of forming an offset configuration in the case where a tool having first and second edges on either side thereof, which have nose radii, respectively, and which define a predetermined inclination angle $\Theta$ is used in such a manner that said tool is moved horizontally and vertically with respect to a rotating workpiece, and said first edge is used when the inclination angle, in a vertical direction, of a machining configuration increases is smaller than said inclination angle $\Theta$, and said second edge is used when the inclination angle, in a vertical direction, of a machining configuration is larger than said inclination angle $\Theta$ wherein the method further comprises the steps of
    (a) when said workpiece is machined with said first edge, forming an offset configuration which is shifted from a final machining configuration by as much as the radius of the tip of said first edge,
    (b) when said workpiece is machined with said second edge, forming an offset configuration which is shifted from a final machining configuration by as much as the radius of the tip of said second edge and shifted by as much as a vector which connects the centers of the radii of the tips of said first and second edges,
    (c) when said first edge is switched over to said second edge in use, before and after the switching point of a final machining configuration, obtaining offset configurations and connecting said configurations to form an offset configuration for the switching point, and
    (d) when said second edge is switched over to said first edge in use, before and after the switching point of a final machining configuration, obtaining offset configurations and connecting said configurations to form a closed loop, and then removing said closed loop to form an offset configuration for the switching point.

* * * * *